US008239050B2

(12) United States Patent
Crockett et al.

(10) Patent No.: US 8,239,050 B2
(45) Date of Patent: Aug. 7, 2012

(54) ECONOMICAL LOUDNESS MEASUREMENT OF CODED AUDIO

(75) Inventors: Brett Graham Crockett, Brisbane, CA (US); Michael John Smithers, Kareela (AU); Alan Jeffrey Seefeldt, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1272 days.

(21) Appl. No.: 11/918,552

(22) PCT Filed: Mar. 23, 2006

(86) PCT No.: PCT/US2006/010823

§ 371 (c)(1), (2), (4) Date: Oct. 12, 2007

(87) PCT Pub. No.: WO2006/113047

PCT Pub. Date: Oct. 26, 2006

(65) Prior Publication Data

US 2009/0067644 A1 Mar. 12, 2009

Related U.S. Application Data

(60) Provisional application No. 60/671,381, filed on Apr. 13, 2005.

(51) Int. Cl.
*G06F 17/00* (2006.01)
*H04R 29/00* (2006.01)

(52) U.S. Cl. .......................................... 700/94; 381/56

(58) Field of Classification Search .................... 700/94; 381/56

See application file for complete search history.

(56) References Cited

U.S. PATENT DOCUMENTS 5,377,277 A 12/1994 Bisping
RE34,961 E 6/1995 Widin et al.
6,185,309 B1 2/2001 Attias
6,430,533 B1 8/2002 Kolluru et al.
7,171,272 B2 1/2007 Blarney et al.
(Continued)

FOREIGN PATENT DOCUMENTS

JP H06-324093 11/1994
(Continued)

OTHER PUBLICATIONS

Australian Government IP Australia, Examiner's first report on patent application No. 2005299410, mailed Jun. 25, 2009, Australian Patent Appln. No. 2005299410.

(Continued)

*Primary Examiner* — Davetta W Goins
*Assistant Examiner* — Joseph Saunders, Jr.

(57) ABSTRACT

Measuring the loudness of audio encoded in a bitstream that includes data from which an approximation of the power spectrum of the audio can be derived without fully decoding the audio is performed by deriving the approximation of the power spectrum of the audio from said bitstream without fully decoding the audio, and determining an approximate loudness of the audio in response to the approximation of the power spectrum of the audio. The data may include coarse representations of the audio and associated finer representations of the audio, the approximation of the power spectrum of the audio being derived from the coarse representations of the audio. In the case of subband encoded audio, the coarse representations of the audio may comprise scale factors and the associated finer representations of the audio may comprise sample data associated with each scale factor.

11 Claims, 4 Drawing Sheets

U.S. PATENT DOCUMENTS

| | | | | |
|---|---|---|---|---|
| 7,212,640 | B2 | 5/2007 | Bizjak | |
| 7,912,226 | B1 * | 3/2011 | James et al. | 381/56 |
| 2001/0027393 | A1 | 10/2001 | Touimi et al. | |
| 2003/0035549 | A1 | 2/2003 | Bizjak et al. | |
| 2004/0184537 | A1 | 9/2004 | Geiger et al. | |

FOREIGN PATENT DOCUMENTS

| | | |
|---|---|---|
| JP | 2001-141748 | 5/2001 |
| WO | 2004-073178 A | 8/2004 |

OTHER PUBLICATIONS

Israel Patent Office, Examiner's Report on Israel Application No. 182097 mailed Apr. 11, 2010, Israel Patent Appln. No. 182097.

Intellectual Property Corporation of Malaysia, Substantive/Modified Substantive Examination Adverse Report (Section 30(1)/30(2)) and Search Report, dated Dec. 5, 2008, Malaysian Patent Appln. No. PI 20055232.

Dept of Justice & Human Rights of Republic of Indonesia, Directorate General Intellectual Property Rights, First Office Action received Apr. 22, 2010, Indonesian Patent Appln. No. WO0200701285.

State Intellectual Property Office of the People's Republic of China, Notification of the Third Office Action, mailed Apr. 21, 2010, China Patent Appln. No. 200580036760.7.

European Patent Office Searching Authority, Int'l Search Report and Written Opinion, Int'l Appln. No. PCT/US2004/016964, mailed Jun. 20, 2005.

Smith, P. J., et al., "Tandem-Free VOIP Conferencing: A Bridge to Next-Generation Networks", IEEE Communications Magazine, IEEE Service Center, New York, NY US, vol. 41, No. 5, May 2003, pp. 136-145.

European Patent Office, "Int'l Search Report and the Written Opinion of the Int'l Searching Authority", International Searching Authority, mailed Jul. 25, 2006, Int'l Application No. PCT/US2006/010823.

Australian Patent Office, "First Written Opinion", APO/SG/408, Application No. SG 200716500-4, mailed Sep. 9, 2008.

Australian Patent Office, "Second Written Opinion", APO/SG/408, Application No. SG 200716500-4, mailed May 27, 2009.

European Patent Office, "Written Opinion", EPA Form 2906, Appln No. 06 739 542 6-2225, dated Jan. 4, 2008.

The Patent Office of the People's Republic of China ("SIPO") "Notification First Office Action", Appln No. 200680012139.1, dated Aug. 5, 2009.

* cited by examiner

ECONOMICAL LOUDNESS MEASUREMENT OF CODED AUDIO

TECHNICAL FIELD

The invention relates to audio signal processing. More particularly, it relates to an economical calculation of an objective loudness measure of low-bitrate coded audio such as audio coded using Dolby Digital (AC-3), Dolby Digital Plus, or Dolby E. "Dolby", "Dolby Digital", "Dolby Digital Plus", and "Dolby E" are trademarks of Dolby Laboratories Licensing Corporation. Aspects of the invention may also be usable with other types of audio coding.

BACKGROUND ART

Details of Dolby Digital coding are set forth in the following references:

*ATSC Standard A52/A: Digital Audio Compression Standard* (*AC*-3), *Revision A*, Advanced Television Systems Committee, 20 Aug. 2001. The A/52A document is available on the World Wide Web at http://www.atsc.org/standards.html.

"Flexible Perceptual Coding for Audio Transmission and Storage," by Craig C. Todd, et al, 96$^{th}$ *Convention of the Audio Engineering Society*, Feb. 26, 1994, Preprint 3796;

"Design and Implementation of AC-3 Coders," by Steve Vernon, *IEEE Trans. Consumer Electronics*, Vol. 41, No. 3, August 1995.

"The AC-3 Multichannel Coder" by Mark Davis, Audio Engineering Society Preprint 3774, 95th AES Convention, October, 1993.

"High Quality, Low-Rate Audio Transform Coding for Transmission and Multimedia Applications," by Bosi et al, Audio Engineering Society Preprint 3365, 93rd AES Convention, October, 1992.

U.S. Pat. Nos. 5,583,962; 5,632,005; 5,633,981; 5,727,119; 5,909,664; and 6,021,386.

Details of Dolby Digital Plus coding are set forth in "Introduction to Dolby Digital Plus, an Enhancement to the Dolby Digital Coding System,"AES Convention Paper 6196, 117$^{th}$ AES Convention, Oct. 28, 2004.

Details of Dolby E coding are set forth in "Efficient Bit Allocation, Quantization, and Coding in an Audio Distribution System", AES Preprint 5068, 107th AES Conference, August 1999 and "Professional Audio Coder Optimized for Use with Video", AES Preprint 5033, 107th AES Conference August 1999.

An overview of various perceptual coders, including Dolby encoders, MPEG encoders, and others is set forth in "Overview of MPEG Audio: Current and Future Standards for Low-Bit-Rate Audio Coding," by Karlheinz Brandenburg and Marina Bosi, J. Audio Eng. Soc., Vol. 45, No. 1/2, January/February 1997.

All of the above-cited references are hereby incorporated by reference, each in its entirety.

Many methods exist for objectively measuring the perceived loudness of audio signals. Examples of methods include weighted power measures (such as LeqA, LeqB, LeqC) as well as psychoacoustic-based measures of loudness such as "Acoustics—Method for Calculating Loudness Level,"ISO 532 (1975). Weighted power loudness measures process the input audio signal by applying a predetermined filter that emphasizes more perceptibly sensitive frequencies while deemphasizing less perceptibly sensitive frequencies, and then averaging the power of the filtered signal over a predetermined length of time. Psychoacoustic methods are typically more complex and aim to model better the workings of the human ear. This is achieved by dividing the audio signal into frequency bands that mimic the frequency response and sensitivity of the ear, and then manipulating and integrating these bands while taking into account psychoacoustic phenomenon such as frequency and temporal masking, as well as the non-linear perception of loudness with varying signal intensity. The aim of all objective loudness measurement methods is to derive a numerical measurement of loudness that closely matches the subjective perception of loudness of an audio signal.

Perceptual coding or low-bitrate audio coding is commonly used to data compress audio signals for efficient storage, transmission and delivery in applications such as broadcast digital television and the online Internet sale of music. Perceptual coding achieves its efficiency by transforming the audio signal into an information space where both redundancies and signal components that are psychoacoustically masked can be easily discarded. The remaining information is packed into a stream or file of digital information. Typically, measuring the loudness of the audio represented by low-bitrate coded audio requires decoding the audio back into the time domain (e.g., PCM), which can be computationally intensive. However, some low-bitrate perceptual-coded signals contain information that may be useful to a loudness measurement method, thereby saving the computational cost of fully decoding the audio. Dolby Digital (AC-3), Dolby Digital Plus, and Dolby E are among such audio coding systems.

The Dolby Digital, Dolby Digital Plus, and Dolby E low-bitrate perceptual audio coders divide audio signals into overlapping, windowed time segments (or audio coding blocks) that are transformed into a frequency domain representation. The frequency domain representation of spectral coefficients is expressed by an exponential notation comprising sets of an exponent and associated mantissas. The exponents, which function in the manner of scale factors, are packed into the coded audio stream. The mantissas represent the spectral coefficients after they have been normalized by the exponents. The exponents are then passed through a perceptual model of hearing and used to quantize and pack the mantissas into the coded audio stream. Upon decoding, the exponents are unpacked from the coded audio stream and then passed through the same perceptual model to determine how to unpack the mantissas. The mantissas are then unpacked, combined with the exponents to create a frequency domain representation of the audio that is then decoded and converted back to a time domain representation.

Because many loudness measurements include power and power spectrum calculations, computational savings may be achieved by only partially decoding the low-bitrate coded audio and passing the partially decoded information (such as the power spectrum) to the loudness measurement. The invention is useful whenever there is a need to measure loudness but not to decode the audio. It exploits the fact that a loudness measurement can make use of an approximate version of the audio, such approximation not usually being suitable for listening. An aspect of the present invention is the recognition that a coarse representation of the audio, which is available without fully decoding a bitstream in many audio coding systems, can provide an approximation of the audio spectrum that is usable in measuring the loudness of the audio. In Dolby Digital, Dolby Digital Plus, and Dolby E audio coding, exponents provide an approximation of the power spectrum of the audio. Similarly, in certain other coding systems, scale factors, spectral envelopes, and linear predictive coefficients may provide an approximation of the power spectrum of the audio. These and other aspects and advantages of the invention will be better understood as the following summary and description of the invention are read and understood.

The invention provides a computationally economical measurement of the perceived loudness of low-bitrate coded audio. This is achieved by only partially decoding the audio material and by passing the partially decoded information to a loudness measurement. The method takes advantage of specific properties of the partially decoded audio information such as the exponents in Dolby Digital, Dolby Digital Plus, and Dolby E audio coding.

A first aspect of the invention measures the loudness of audio encoded in a bitstream that includes data from which an approximation of the power spectrum of the audio can be derived without fully decoding the audio by deriving the approximation of the power spectrum of the audio from the bitstream without fully decoding the audio, and determining an approximate loudness of the audio in response to the approximation of the power spectrum of the audio.

In another aspect of the invention, the data may include coarse representations of the audio and associated finer representations of the audio, in which case the approximation of the power spectrum of the audio may be derived from the coarse representations of the audio.

In a further aspect of the invention, the audio encoded in a bitstream may be subband encoded audio having a plurality of frequency subbands, each subband having a scale factor and sample data associated therewith, and in which the coarse representations of the audio comprise scale factors and the associated finer representations of the audio comprise sample data associated with each scale factor.

In yet a further aspect of the invention, the scale factor and sample data of each subband may represent spectral coefficients in the subband by exponential notation in which the scale factor comprises an exponent and the associated sample data comprises mantissas.

In yet a further aspect of the invention, the audio encoded in a bitstream may be linear predictive coded audio in which the coarse representations of the audio comprise linear predictive coefficients and the finer representations of the audio comprise excitation information associated with the linear predictive coefficients.

In still a further aspect of the invention, the coarse representations of the audio may comprise at least one spectral envelope and the finer representations of the audio may comprise spectral components associated with the at least one spectral envelope.

In still yet a further aspect of the invention, determining an approximate loudness of the audio in response to the approximation of the power spectrum of the audio may include applying a weighted power loudness measure. The weighted power loudness measure may employ a filter that deemphasizes less perceptible frequencies and averages the power of the filtered audio over time.

In yet another aspect of the invention, determining an approximate loudness of the audio in response to the approximation of the power spectrum of the audio may include applying a psychoacoustic loudness measure. The psychoacoustic loudness measure may employ a model of the human ear to determine specific loudness in each of a plurality of frequency bands similar to the critical bands of the human ear. In a subband coder environment, the subbands may be similar to the critical bands of the human ear and the psychoacoustic loudness measure may employ a model of the human ear to determine specific loudness in each of the subbands.

Aspects of the invention include methods practicing the above functions, means practicing the functions, apparatus practicing the methods, and a computer program, stored on a computer-readable medium for causing a computer to perform the methods practicing the above functions.

BEST MODE FOR CARRYING OUT THE INVENTION

A benefit of aspects of the present invention is the measurement of the loudness of low-bitrate coded audio without the need to decode fully the audio to PCM, which decoding includes expensive decoding processing steps such as bit allocation, de-quantization, an inverse transformation, etc. Aspects of the invention greatly reduce the processing requirements (computational overhead). This approach is beneficial when a loudness measurement is desired but the decoded audio is not needed.

Aspects of the present invention are usable, for example, in environments such as disclosed in (1) pending U.S. Non-Provisional patent application Ser. No. 10/884,177, filed Jul. 1, 2004, entitled "Method for Correcting Metadata Affecting the Playback Loudness and Dynamic Range of Audio Information," by Smithers et al. (2) U.S. Patent Provisional Application Ser. No. 60/671,361, filed the same day as the present application, entitled "Audio Metadata Verification," by Brett Graham Crockett, and (3) and in the performance of loudness measurement and correction in a broadcast storage or transmission chain in which access to the decoded audio is not needed and is not desirable. Said Ser. No. 10/884,177 and said applications are hereby incorporated by reference in their entirety.

The processing savings provided by aspects of the invention also help make it possible to perform loudness measurement and metadata correction (e.g., changing a DIALNORM parameter to the correct value) in real time on a large number of low-bitrate data compressed audio signals. Often, many low-bitrate coded audio signals are multiplexed and transported in MPEG transport streams. The loudness measurement according to aspects of the present invention makes loudness measurement in real time on a large number of compressed audio signals much more feasible when compared to the requirements of fully decoding the compressed audio signals to PCM to perform the loudness measurement.

Figure 1:
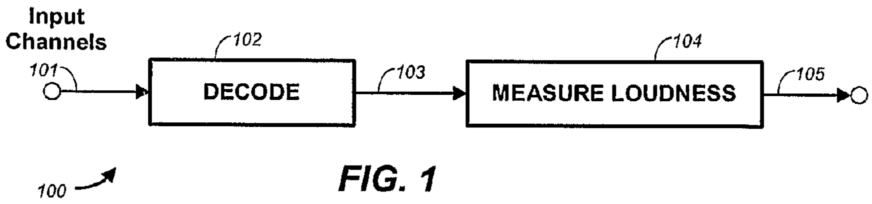
FIG. 1 PRIOR ART
FIG. 1 shows a schematic functional block diagram of a general arrangement for measuring the loudness of low-bitrate coded audio.

FIG. 1 shows a prior art arrangement for measuring the loudness of coded audio. Coded digital audio data or information 101, such as audio that has been low-bitrate encoded, is decoded by a decoder or decoding function ("Decode") 102 into, for example, a PCM audio signal 103. This signal is then applied to a loudness measurer or measuring method or algorithm ("Measure Loudness") 104 that generates a measured loudness value 105.

Figure 2:
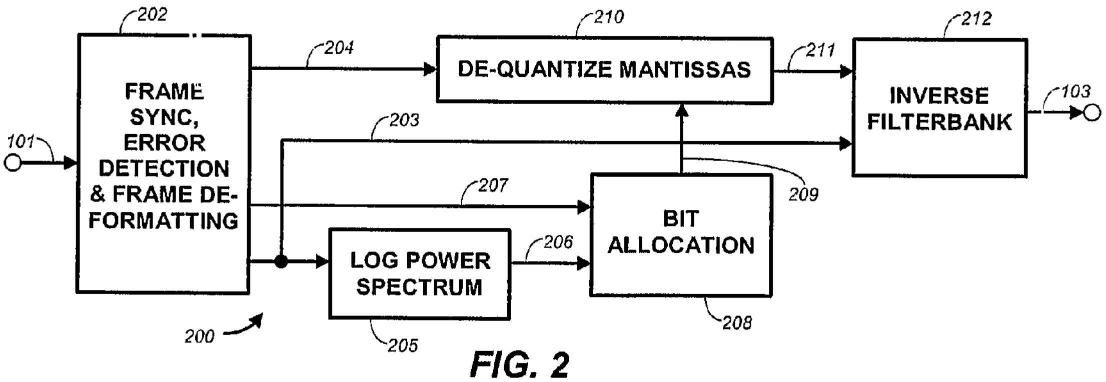
FIG. 2 PRIOR ART
FIG. 2 shows a generalized schematic functional block diagram of a Dolby Digital, a Dolby Digital Plus, and a Dolby E decoder.

FIG. 2 shows a prior art structural or functional block diagram of an example of a Decode 102. The structure or functions it shows are representative of Dolby Digital, Dolby Digital Plus, and Dolby E decoders. Frames of coded audio data 101 are applied to a data unpacker or unpacking function ("Frame Sync, Error Detection & Frame Deformatting") 202 that unpacks the applied data into exponent data 203, mantissa data 204, and other miscellaneous bit allocation information 207. The exponent data 203 is converted into a log power spectrum 206 by a device or function ("Log Power Spectrum") 205 and this log power spectrum is used by a bit allocator or bit allocation function ("Bit Allocation") 208 to calculate signal 209, which is the length, in bits, of each quantized mantissa. The mantissas are then de-quantized and combined with the exponents by a device or function ("De-Quantize Mantissas") 210 and converted back to the time domain by an inverse filterbank device or function ("Inverse Filterbank") 212. Inverse Filterbank 212 also overlaps and sums a portion of the current Inverse Filterbank result with the previous Inverse Filterbank result (in time) to create the decoded audio signal 103. In practical decoder implementations, significant computing resources are required by the Bit Allocation, De-Quantize Mantissas and Inverse Filterbank devices or functions. More details of the decoding process may be found in ones of the above-cited references.

Figure 3A:
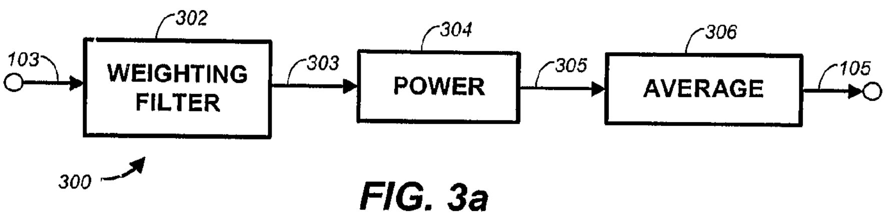
FIG. 3a PRIOR ART
FIGS. 3*a* and 3*b* show schematic functional block diagrams of two general arrangements for calculating an objective loudness measure using weighted power and psychoacoustically-based measures, respectively.
Figure 3B:
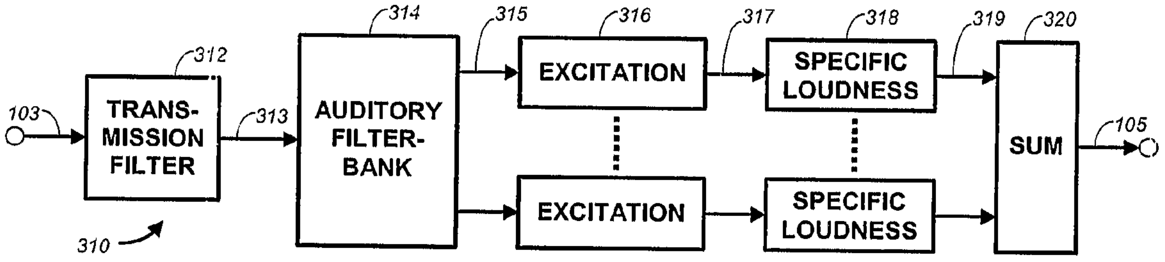
FIG. 3b PRIOR ART

FIGS. 3*a* and 3*b* show prior art arrangements for objectively measuring the loudness of an audio signal. These represent variations of the Measure Loudness 104 (FIG. 1). Although FIGS. 3*a* and 3*b* show examples, respectively of two general categories of objective loudness measuring techniques, the choice of a particular objective measuring technique is not critical to the invention and other objective loudness measuring techniques may be employed.

Figure 4:
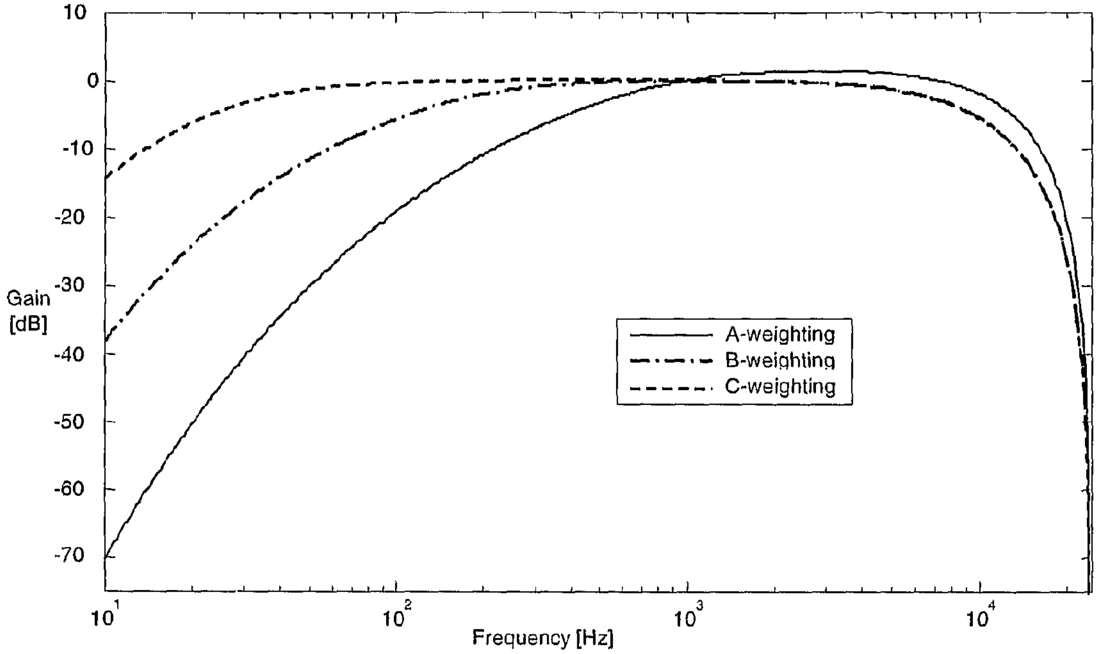
FIG. 4 PRIOR ART
FIG. 4 shows common frequency weightings used when measuring loudness according to the arrangement of the example of FIG. 3*a*.

FIG. 3*a* shows an example of the weighted power measure arrangement commonly used in loudness measuring. An audio signal 103 is passed through a weighting filter or filtering function ("Weighting Filter") 302 that is designed to emphasize more perceptibly sensitive frequencies while deemphasizing less perceptibly sensitive frequencies. The power 305 of the filtered signal 303 is calculated by a device or function ("Power") 304 and averaged over a defined time period by a device or function ("Average") 306 to create a loudness value 105. A number of different standard weighting filter characteristics exist and some common examples are shown in FIG. 4. In practice, modified versions of the FIG. 3*a* arrangement are often used, the modifications, for example, preventing time periods of silence from being included in the average.

Psychoacoustic-based techniques are often also used to measure loudness. FIG. 3*b* shows a typical prior art arrangement of such a psychoacoustic-based arrangement. An audio signal 103 is filtered by a transmission filter or filtering function ("Transmission Filter") 312 that represents the frequency-varying magnitude response of the outer and middle ear. The filtered signal 313 is then separated by an auditory filterbank or filterbank function ("Auditory Filterbank") 314 into frequency bands that are equivalent to, or narrower than, auditory critical bands. This may be accomplished by performing a fast Fourier transform (FFT) (as implemented, for example, by a discrete frequency transform (DFT)) and then grouping the linearly spaced bands into bands approximating the ear's critical bands (as in an ERB or Bark scale). Alternatively, this may be accomplished by a single bandpass filter for each ERB or Bark band. Each band is then converted by a device or function ("Excitation") 316 into an excitation signal 317 representing the amount of stimuli or excitation experienced by the human ear within the band. The perceived loudness or specific loudness for each band is then calculated from the excitation by a device or function ("Specific Loudness") 318 and the specific loudness across all bands is summed by a summer or summing function ("Sum") 320 to create a single measure of loudness 105. The summing process may take into consideration various perceptual effects, for example frequency masking. In practical implementations of these perceptual methods, significant computational resources are required for the transmission filter and auditory filterbank.

Figure 5:
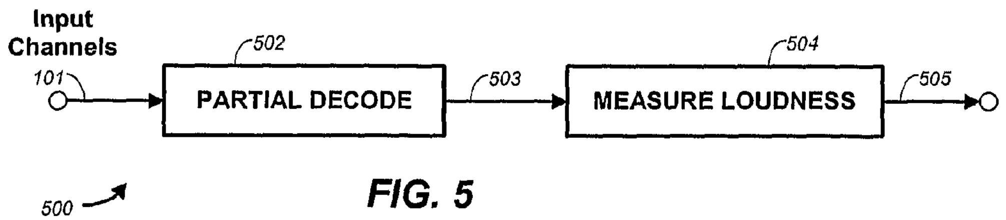
FIGS. 5 is a schematic functional block diagram showing a more economical general arrangement for measuring the loudness of coded audio in accordance with aspects of the invention.

FIG. 5 shows a block diagram of an aspect of the present invention. A coded digital audio signal 101 is partially decoded by a device or function ("Partial Decode") 502 and the loudness is measured from the partially decoded information 503 by a device or function ("Measure Loudness") 504. Depending on how the partial decoding is performed, the resulting loudness measure 505 may be very similar to, but not exactly the same as, the loudness measure 105 calculated from the completely decoded audio signal 103 (FIG. 1). In the context of Dolby Digital, Dolby Digital Plus and Dolby E implementations of aspects of the invention, partial decoding may include the omission of the Bit Allocation, De-Quantize Mantissas and Inverse Filterbank devices or functions from a decoder such as the example of FIG. 2.

Figure 6A:
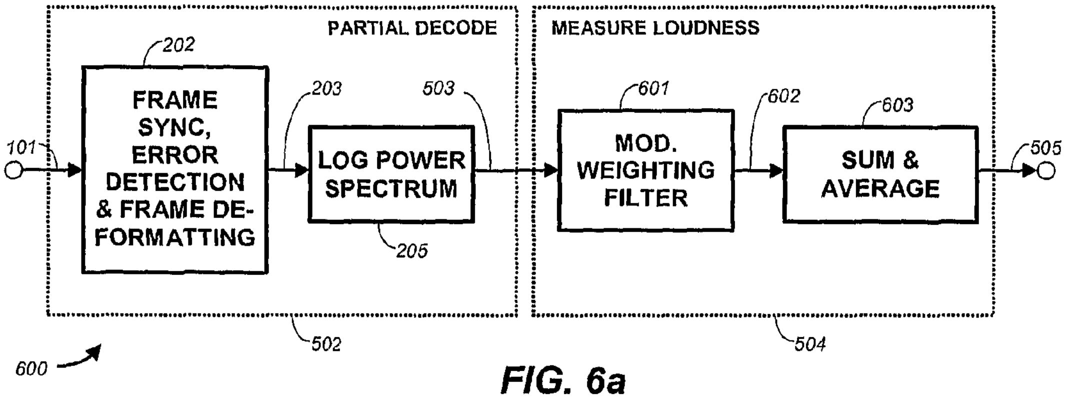
FIGS. 6*a* and 6*b* are schematic functional block diagrams of the more economical arrangement for measuring loudness incorporating the loudness arrangements shown in the examples of FIGS. 3*a* and 3*b* in accordance with aspects of the invention.
Figure 6B:
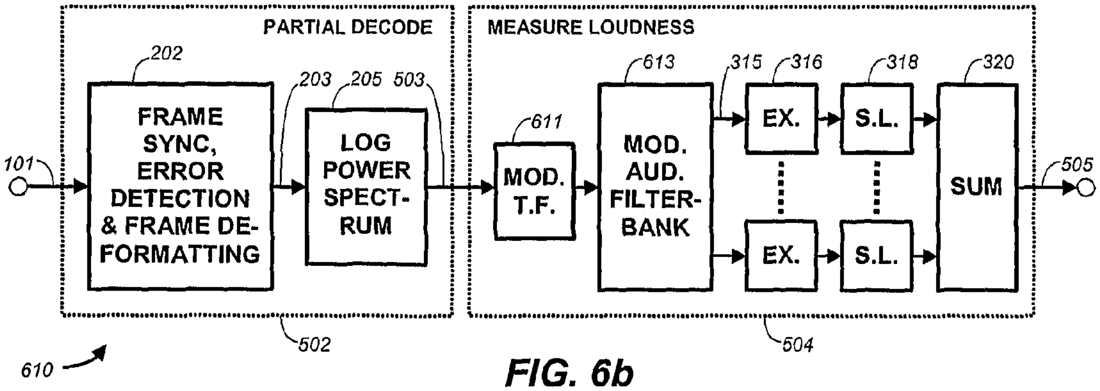

FIGS. 6*a* and 6*b* show two examples of implementations of the general arrangement of FIG. 5. Although both may employ the same Partial Decode 502 function or device, each may have a different Measure Loudness 504 function or device—that in the FIG. 6*a* example being similar to the example of FIG. 3*a* and that in the FIG. 6*a* example being similar to the FIG. 6*b* example. In both examples, the Partial Decode 502 extracts only the exponents 203 from the coded audio stream and converts the exponents to a power spectrum 206. Such extraction may be performed by a device or function ("Frame Sync, Error Detection & Frame De-Formatting") 202 as in the FIG. 2 example and such conversion may be performed by a device or function ("Log Power Spectrum") 205 as in the FIG. 2 example. There is no requirement to de-quantize the mantissas, perform bit allocation, and perform an inverse filterbank as would be required for a full decoding as shown in the decoding example of FIG. 2.

The example of FIG. 6*a* includes a Measure Loudness 504, which may be a modified version of the loudness measurer or loudness measuring function of FIG. 3*a*. In this example, a modified weighting filtering is applied in the frequency domain by increasing or decreasing the power values in each band by a weighting filter or weighted filtering function ("Modified Weighting Filter") 601. In contrast, the FIG. 3*a* example applies weighting filtering in the time domain. Although it operates in the frequency domain, the Modified Weighting Filter affects the audio in the same way as the time-domain Weighting Filter of FIG. 3*a*. The filter 601 is "modified"with respect to filter 302 of FIG. 3*a* in the sense that it operates on log amplitude values rather than linear values and it operates on a non-linear rather than a linear frequency scale. The frequency weighted power spectrum 602 is then converted to linear power and summed across frequency and averaged across time by a device or function ("Convert, Sum & Average") 603 applying, for example, Equation 5, below. The output is an objective loudness value 505.

The example of FIG. 6*b* includes a Measure Loudness 504, which may be a modified version of the loudness measurer or loudness measuring function of FIG. 3*b*. In this example, a modified transmission filter or filtering function ("Modified Transmission Filter") 611 is applied directly in the frequency domain by increasing or decreasing the log power values in each band. In contrast, the FIG. 3*b* example applies weighting filtering in the time domain. Although it operates in the frequency domain, the Modified Transmission Filter affects the audio in the same way as the time-domain Transmission Filter of FIG. 3*b*. A modified auditory filterbank or filterbank function ("Modified Auditory Filterbank") 613 accepts as input the linear frequency band spaced log power spectrum and splits or combines these linearly spaced bands into a critical-band-spaced (e.g., ERB or Bark bands) filterbank output 315. Modified Auditory Filterbank 613 also converts the log-domain power signal into a linear signal for the following excitation device or function ("Excitation") 316. The Modified Auditory Filterbank 613 is "modified" with respect to the Auditory Filterbank 314 of FIG. 3*b* in that it operates on log amplitude values rather than linear values and converts such log amplitude values into linear values. Alternatively, the grouping of bands into ERB or Bark bands may be performed in the Modified Auditory Filterbank 613 rather than the Modified Transmission Filter 611. The example of FIG. 6*b* also includes a Specific Loudness 318 for each band and a Sum 320 as in the example of FIG. 3*b*.

For the arrangements shown in FIGS. 6*a* and 6*b*, significant computational savings are achieved because the decoding does not require bit allocation, mantissa de-quantization and an inverse filterbank. However, for both the FIG. 6*a* and FIG. 6*b* arrangements, the resulting objective loudness measurement may not be exactly the same as the measurement calculated from fully decoded audio. This is because some of the audio information is discarded and thus the audio information used for the measurement is incomplete. When aspects of the present invention are applied to Dolby Digital, Dolby Digital Plus, or Dolby E, the mantissa information is discarded and only the coarsely quantized exponent values are retained. For Dolby Digital and Dolby Digital Plus the values are quantized to increments of 6 dB and for Dolby E they are quantized to increments of 3 dB. The smaller quantization steps in Dolby E result in finer quantized exponent values and, consequently, a more accurate estimate of the power spectrum.

Perceptual coders are often designed to alter the length of the overlapping time segments, also called the block size, in conjunction with certain characteristics of the audio signal. For example Dolby Digital uses two block sizes—a longer block of 512 samples predominantly for stationary audio signals and a shorter block of 256 samples for more transient audio signals. The result is that the number of frequency bands and corresponding number of log power spectrum values 206 varies block by block. When the block size is 512 samples, there are 256 bands, and when the block size is 256 samples, there are 128 bands.

There are many ways that the proposed methods in FIGS. 6*a* and 6*b* may handle varying block sizes and each way leads to a similar resulting loudness measure. For example, the Log Power Spectrum 205 may be modified to output always a constant number of bands at a constant block rate by combining or averaging multiple smaller blocks into larger blocks and spreading the power from the smaller number of bands across the larger number of bands. Alternatively, the Measure Loudness may accept varying block sizes and adjust accordingly their filtering, excitation, specific loudness, averaging and summing processes, for example, by adjusting time constants.

Weighted Power Measurement Example

As an example of aspects of the present invention, a highly-economical version of a weighted power loudness measurement method may use Dolby Digital bitstreams and the weighted power loudness measure LeqA. In this highly-economical example, only the quantized exponents contained in a Dolby Digital bitstream are used as an estimate of the audio signal spectrum to perform the loudness measure. This avoids the additional computational requirements of performing bit allocation to recreate the mantissa information, which would otherwise only provide a slightly more accurate estimate of the signal spectrum.

As depicted in the examples of FIGS. 5 and 6*a*, the Dolby Digital bitstream is partially decoded to recreate and extract the log power spectrum, calculated from the quantized exponent data contained in the bitstream. Dolby Digital performs low-bitrate audio encoding by windowing 512 consecutive, 50% overlapped PCM audio samples and performing an MDCT transform, resulting in 256 MDCT coefficients that are used to create the low-bitrate coded audio stream. The partial decoding performed in FIGS. 5 and 6*a* unpacks the exponent data E(k) and converts the unpacked data to 256 quantized log power spectrum values, P(k), which form a coarse spectral representation of the audio signal. The log power spectrum values, P(k), are in units of dB. The conversion is as follows $$P(k)=-E(k)\cdot 20\cdot \log_{10}(2)\quad 0\leq k<N \tag{1}$$

where N=256, the number of transform coefficients for each block in a Dolby Digital bit stream. To use the log power spectrum in the computation of the weighted power measure of loudness, the log power spectrum is weighted using an appropriate loudness curve, such as one of the A-, B-or C-weighting curves shown in FIG. 4. In this case, the LeqA power measure is being computed and therefore the A-weighting curve is appropriate. The log power spectrum values P(k) are weighted by adding them to discrete, A-weighting frequency values, $A_W(k)$, also in units of dB as $$P_W(k)=P(k)+A_W(k)\quad 0\leq k<N \tag{2}$$

The discrete A-weighting frequency values, $A_W(k)$, are created by computing the A-weighting gain values for the discrete frequencies, $f_{discrete}$, where $$f_{discrete}=\frac{F}{2}+F\cdot k \qquad 0\leq k<N \tag{3}$$

where $$F=\frac{F_s}{2\cdot N} \qquad 0\leq k<N \tag{4}$$

and where the sampling frequency $F_s$ is typically equal to 48 kHz for Dolby Digital. Each set of weighted log power spectrum values, $P_W(k)$, are then converted from dB to linear power and summed to create the A-weighted power estimate $P_{POW}$ of the 512 PCM audio samples as $$P_{POW} = \sum_{k=0}^{N-1} 10^{(P_W(k)/10)} \tag{5}$$

As stated previously, each Dolby Digital bitstream contains consecutive transforms created by windowing 512 PCM samples with 50% overlap and performing the MDCT transform. Therefore, an approximation of the total A-weighted power, $P_{TOT}$, of the audio low-bitrate encoded in a Dolby Digital bitstream may be computed by averaging the power values across all the transforms in the Dolby Digital bitstream as follows $$P_{TOT} = \frac{1}{M}\sum_{m=0}^{M-1} P_{POW}(m) \tag{6}$$

where M equals the total number of transforms contained in the Dolby Digital bitstream. The average power is then converted to units of dB as follows.

$$L_A = 10\cdot\log_{10}(P_{TOT}) - C \tag{7}$$

where C is a constant offset due to level changes performed in the transform process during encoding of the Dolby Digital bitstream.

Psychoacoustic Measurement Example

As another example of aspects of the present invention, a highly-economical version of a weighted power loudness measurement method may use Dolby Digital bitstreams and a psychoacoustic loudness measure. In this highly-economical example, as in the previous one, only the quantized exponents contained in a Dolby Digital bitstream are used as an estimate of the audio signal spectrum to perform the loudness measure. As in the other example, this avoids the additional computational requirements of performing bit allocation to recreate the mantissa information, which would otherwise only provide a slightly more accurate estimate of the signal spectrum.

International Patent Application No. PCT/US2004/016964, filed May 27, 2004, Seefeldt et al, published as WO 2004/111994 A2 on Dec. 23, 2004, which application designates the United States, discloses, among other things, an objective measure of perceived loudness based on a psychoacoustic model. Said application is hereby incorporated by reference in its entirety. The log power spectrum values, P(k), derived from the partial decoding of a Dolby Digital bitstream may serve as inputs to a technique, such as in said international application, as well as other similar psychoacoustic measures, rather than the original PCM audio. Such an arrangement is shown in the example of FIG. 6*b*. Borrowing terminology and notation from said PCT application, an excitation signal E(b) approximating the distribution of energy along the basilar membrane of the inner ear at critical band b may be approximated from the log power spectrum values as follows:

$$E(b) = \sum_k |T(k)|^2 |H_b(k)|^2 10^{P(k)/10} \tag{8}$$

where T(k) represents the frequency response of the transmission filter and $H_b(k)$ represents the frequency response of the basilar membrane at a location corresponding to critical band b, both responses being sampled at the frequency corresponding to transform bin k. Next the excitations corresponding to all transforms in the Dolby Digital bitstream are averaged to produce a total excitation:

$$\overline{E}(b) = \frac{1}{M}\sum_m E(b, m) \tag{9}$$

Using equal loudness contours, the total excitation at each band is transformed into an excitation level that generates the same loudness at 1 kHz. Specific loudness, a measure of perceptual loudness distributed across frequency, is then computed from the transformed excitation, $\overline{E}_{1kHz}(b)$, through a compressive non-linearity:

$$N(b) = G\left(\left(\frac{\overline{E}_{1kHz}(b)}{TQ_{1kHz}}\right)^{\alpha} - 1\right) \tag{10}$$

where $TQ_{1kHz}$ is the threshold in quiet at 1 kHz and the constants G and $\alpha$ are chosen to match data generated from psychoacoustic experiments describing the growth of loudness. Finally, the total loudness, L, represented in units of sone, is computed by summing the specific loudness across bands:

$$L = \sum_b N(b) \tag{11}$$

For the purposes of adjusting the audio signal, one may wish to compute a matching gain, $G_{Match}$, which when multiplied with the audio signal makes the loudness of the adjusted audio equal to some reference loudness, $L_{REF}$, as measured by the described psychoacoustic technique. Because the psychoacoustic measure involves a non-linearity in the computation of specific loudness, a closed form solution for $G_{Match}$ does not exist. Instead, an interactive technique described in said PCT application may be employed in which the square of the matching gain is adjusted and multiplied with the total excitation, $\overline{E}(b)$, until the corresponding total loudness, L, is within a threshold difference with respect to the reference loudness, $L_{REF}$. The loudness of the audio may then be expressed in dB with respect to the reference as:

$$L_{dB} = 20\log_{10}\left(\frac{1}{G_{Match}}\right) \tag{12}$$

Other Perceptual Audio Codecs

Aspects of the present invention are not limited to Dolby Digital, Dolby Digital Plus, and Dolby E coding systems. Audio signals coded using certain other coding systems in which an approximation of the power spectrum of the audio is provided by, for example, scale factors, spectral envelopes, and linear predictive coefficients that may be recovered from an encoded bitstream without fully decoding the bitstream to produce audio may also benefit from aspects of the present invention.

Error in Calculating Power from Dolby Digital Exponents

The Dolby Digital exponents E(k) represent a coarse quantization of the logarithm of the MDCT spectrum coefficients. There are a number of sources of error when using these values as a coarse power spectrum.

First, in Dolby Digital, the quantization process itself results in mean error of approximately 2.7 dB when comparing the values of the power spectrum generated from the exponents (see Equation 1, above) and the power values calculated directly from the MDCT coefficients. This mean error, which was determined experimentally, may be incorporated into the constant offset C in Equation 7, above.

Second, under certain signal conditions, such as transients, exponent values are grouped across frequency (referred to as "D25" and "D45" modes in the above-cited A/52A document). This grouping across frequency causes the mean exponent error to be less predictable, and thus more difficult to account for by incorporating into the constant C of Equation 7. In practice, error due to this grouping may be ignored for two reasons: (1) the grouping is used rarely and (2) the nature of the signals for which the grouping is used results in a measured mean error which is similar to the non-averaged case.

Implementation

The invention may be implemented in hardware or software, or a combination of both (e.g., programmable logic arrays). Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

It will be appreciated that some steps or functions shown in the exemplary figures perform multiple substeps and may also be shown as multiple steps or functions rather than one step or function. It will also be appreciated that various devices, functions, steps, and processes shown and described in various examples herein may be shown combined or separated in ways other than as shown in the various figures. For example, when implemented by computer software instruction sequences, various functions and steps of the exemplary figures may be implemented by multithreaded software instruction sequences running in suitable digital signal processing hardware, in which case the various devices and functions in the examples shown in the figures may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described herein may be order independent, and thus can be performed in an order different from that described.

The invention claimed is:

1. A method for measuring the loudness of audio encoded in a bitstream that includes data from which an approximation of the power spectrum of the audio can be derived without fully decoding the audio, comprising deriving said approximation of the power spectrum of the audio from said bitstream without fully decoding the audio, and determining an approximate loudness of the audio in response to the approximation of the power spectrum of the audio, wherein (a) said data includes coarse representations of the audio and associated finer representations of the audio, (b) said approximation of the power spectrum of the audio is derived from the coarse representations of the audio, and (c) the audio encoded in a bitstream is linear predictive coded audio in which the coarse representations of the audio comprise linear predictive coefficients and the finer representations of the audio comprise excitation information associated with the linear predictive coefficients.

2. A method for measuring the loudness of audio encoded in a bitstream that includes data from which an approximation of the power spectrum of the audio can be derived without fully decoding the audio, comprising deriving said approximation of the power spectrum of the audio from said bitstream without fully decoding the audio, and determining an approximate loudness of the audio in response to the approximation of the power spectrum of the audio, wherein (a) said data includes coarse representations of the audio and associated finer representations of the audio, (b) said approximation of the power spectrum of the audio is derived from the coarse representations of the audio, and (c) the coarse representations of the audio comprise at least one spectral envelope and the finer representations of the audio comprise spectral components associated with said at least one spectral envelope.

3. A method for measuring the loudness of audio encoded in a bitstream that includes data from which an approximation of the power spectrum of the audio can be derived without fully decoding the audio, comprising deriving said approximation of the power spectrum of the audio from said bitstream without fully decoding the audio, and determining an approximate loudness of the audio in response to the approximation of the power spectrum of the audio, wherein (a) said data includes coarse representations of the audio and associated finer representations of the audio, (b) said approximation of the power spectrum of the audio is derived from the coarse representations of the audio, and (c) the audio encoded in a bitstream is subband encoded audio having a plurality of frequency subbands, each subband having a scale factor and sample data associated therewith, and wherein the coarse representations of the audio comprise scale factors and the associated finer representations of the audio comprise sample data associated with each scale factor.

4. A method according to any one of claims 1, 2 and 3 wherein determining an approximate loudness of the audio in response to the approximation of the power spectrum of the audio includes applying a psychoacoustic loudness measure.

5. A method according to claim 4 in which the audio encoded in the bitstream is subband encoded audio having a plurality of subbands in which said subbands are similar to the critical bands of the human ear and the psychoacoustic loudness measure employs a model of the human ear to determine specific loudness in each of said subbands.

6. A method according to any one of claims 1 2 and 3 wherein determining an approximate loudness of the audio in response to the approximation of the power spectrum of the audio includes applying a weighted power loudness measure.

7. A method according to claim 6 in which the weighted power loudness measure employs a filter that deemphasizes less perceptible frequencies and averages the power of the filtered audio over time.

8. A method according to claim 3 wherein the scale factor and sample data of each subband represent spectral coefficients in the subband by exponential notation in which the scale factor comprises an exponent and the associated sample data comprises mantissas.

9. A method according to claim 3 wherein said bitstream is an AC-3 encoded bitstream.

10. Apparatus adapted to perform the methods of any one of claims 1, 2, and 3.

11. A non-transitory computer-readable storage medium encoded with a computer program for causing a computer to perform the method of any one of claims 1, 2 and 3.

* * * * *